(12) United States Patent
Choe et al.

(10) Patent No.: US 11,595,939 B2
(45) Date of Patent: Feb. 28, 2023

(54) METHOD AND APPARATUS FOR CONTROLLING TRANSMISSION OF RESPONSE SIGNAL IN WIRELESS COMMUNICATION SYSTEM

(71) Applicant: LG ELECTRONICS INC., Seoul (KR)

(72) Inventors: Hyunjung Choe, Seoul (KR); Taehun Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 17/282,554

(22) PCT Filed: Oct. 7, 2019

(86) PCT No.: PCT/KR2019/013111
§ 371 (c)(1),
(2) Date: Apr. 2, 2021

(87) PCT Pub. No.: WO2020/076033
PCT Pub. Date: Apr. 16, 2020

(65) Prior Publication Data
US 2021/0352617 A1 Nov. 11, 2021

Related U.S. Application Data

(60) Provisional application No. 62/742,428, filed on Oct. 7, 2018.

(51) Int. Cl.
*H04W 68/00* (2009.01)
*H04W 76/30* (2018.01)
(Continued)

(52) U.S. Cl.
CPC ......... *H04W 68/005* (2013.01); *H04L 1/1896* (2013.01); *H04W 74/0841* (2013.01); *H04W 76/30* (2018.02)

(58) Field of Classification Search
None
See application file for complete search history.

(56) References Cited

U.S. PATENT DOCUMENTS 11,343,022 B2 * 5/2022 Vaidya .................. H04L 1/1825
2012/0208545 A1 * 8/2012 Yang .................... H04W 74/002
455/450

(Continued)

FOREIGN PATENT DOCUMENTS

KR    20180035638    4/2018
WO    2017218749    12/2017

OTHER PUBLICATIONS

PCT International Application No. PCT/KR2019/013111, International Search Report dated Jan. 16, 2020, 2 pages.

(Continued)

*Primary Examiner* — Lonnie V Sweet
(74) *Attorney, Agent, or Firm* — Lee Hong Degerman Kang Waimey

(57) ABSTRACT

The present disclosure relates to method and apparatus for controlling a transmission of a response signal in a wireless communication system. According to an embodiment of the present disclosure, a method performed by a wireless device in a wireless communication system, comprises receiving a signal for a paging from a network; and receiving downlink (DL) data related to the paging, wherein a transmission of at least one of a paging response for the paging or acknowledgment (ACK) information for the DL data is determined based on information included in the signal for the paging.

7 Claims, 18 Drawing Sheets

(51) Int. Cl.
*H04L 1/18*    (2006.01)
*H04W 74/08*   (2009.01)
*H04L 1/1867*  (2023.01)

(56) References Cited

U.S. PATENT DOCUMENTS

| | | | |
|---|---|---|---|
| 2014/0016614 A1* | 1/2014 | Velev | H04W 4/14 |
| | | | 370/331 |
| 2014/0126489 A1* | 5/2014 | Zakrzewski | H04W 74/0833 |
| | | | 370/329 |
| 2014/0204838 A1* | 7/2014 | Kubota | H04W 48/16 |
| | | | 370/328 |
| 2016/0374048 A1* | 12/2016 | Griot | H04W 12/037 |
| 2017/0086062 A1 | 3/2017 | Chen | |
| 2018/0213556 A1* | 7/2018 | Rico Alvarino | H04W 74/004 |
| 2018/0249439 A1* | 8/2018 | Xu | H04W 68/005 |
| 2018/0324869 A1* | 11/2018 | Phuyal | H04W 72/14 |

OTHER PUBLICATIONS

Huawei, et al., "Early DL data transmission," 3GPP TSG-RAN WG2 Meeting #103bis, R2-1813914, Oct. 2018, 10 pages.
Institute for Information Industry (III), "Mobile terminated early data transmission," 3GPP TSG-RAN WG2 Meeting #103, R2-1814351, Oct. 2018, 7 pages.

* cited by examiner

METHOD AND APPARATUS FOR CONTROLLING TRANSMISSION OF RESPONSE SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2019/013111, filed on Oct. 7, 2019, which claims the benefit of U.S. Provisional Application No. 62/742,428, filed on Oct. 7, 2018, the contents of which is incorporated by reference herein in its entirety.

BACKGROUND OF THE DISCLOSURE

Field of the Disclosure

The present disclosure relates to method and apparatus for controlling a transmission of a response signal in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

When a UE receives data or control information from a network, there may be a case the UE need to transmit a response signal for the data or the control information. To transmit the response signal, the UE may transit to a connected mode and request an allocation of a radio access network resource and/or a core network resource in the connected mode. Then, the UE may transmit a response signal through the allocated resources.

SUMMARY OF THE DISCLOSURE

Technical Problem

An aspect of the present disclosure is to provide method and apparatus for controlling a transmission of a response signal in a wireless communications system.

Another aspect of the present disclosure is to provide method and apparatus for controlling a transmission of a paging response for a paging in a wireless communication system.

Yet another aspect of the present disclosure is to provide method and apparatus for controlling a transmission of ACK information for DL data in a wireless communication system.

Technical Solution

According to an embodiment of the present disclosure, a method performed by a wireless device in a wireless communication system, comprises receiving a signal for a paging from a network; and receiving downlink (DL) data related to the paging, wherein a transmission of at least one of a paging response for the paging or acknowledgment (ACK) information for the DL data is determined based on information included in the signal for the paging.

According to an embodiment of the present disclosure, a wireless device in a wireless communication system comprises a memory; a transceiver; and at least one processor, operatively coupled to the memory and the transceiver. The at least one processor is configured to control the transceiver to receive a signal for a paging from a network, and control the transceiver to receive downlink (DL) data related to the paging, wherein a transmission of at least one of a paging response for the paging or acknowledgment (ACK) information for the DL data is determined based on information included in the signal for the paging.

Advantageous Effect

The present disclosure can have various advantageous effects.

For example, according to various embodiments of the present disclosure, the UE can transmit a response signal selectively to a network and does not have to always transmit the response signal to the network, based on information, indicator and/or configuration. Therefore, power consumption of the UE and message latency can be reduced, and signalling overhead can also be reduced.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
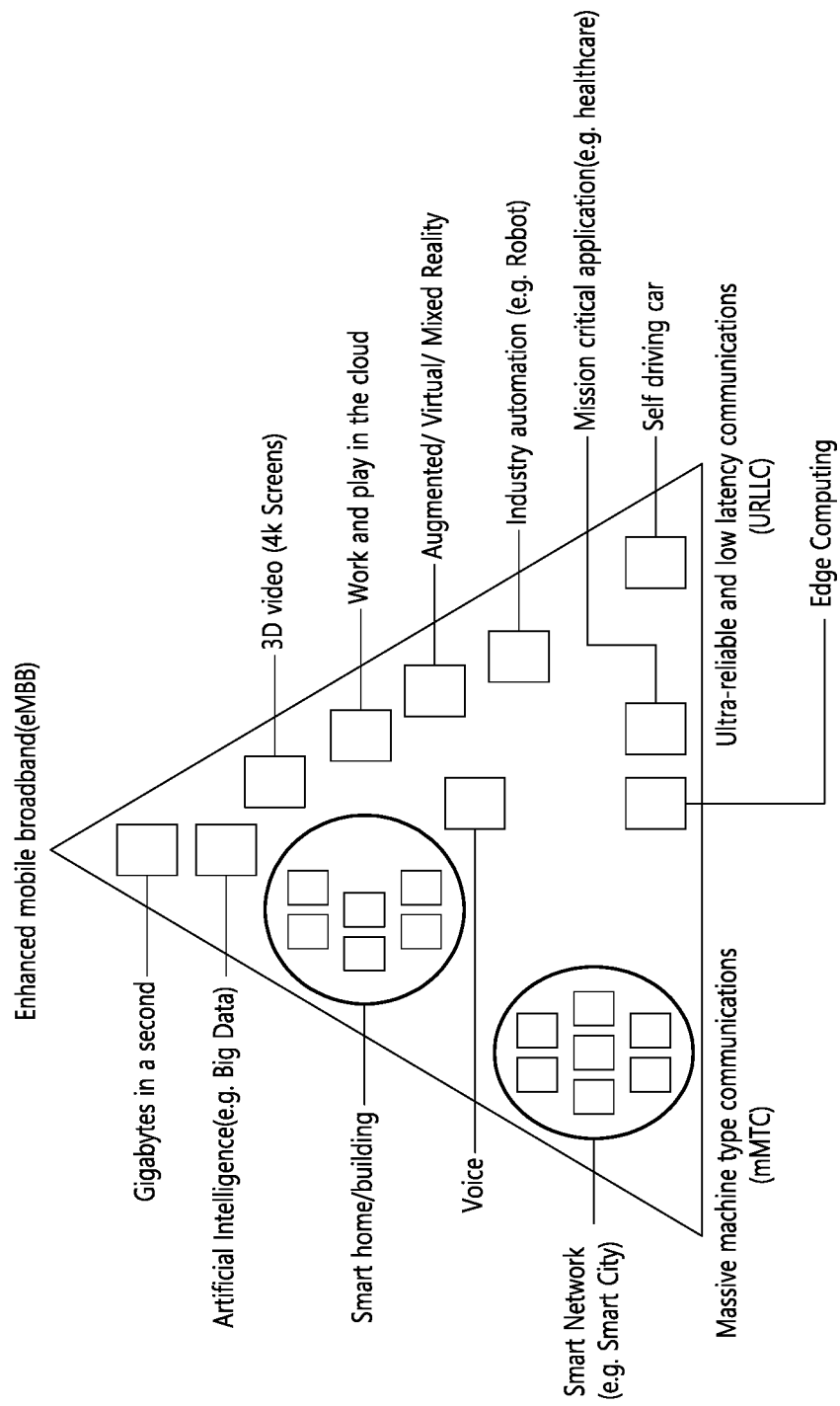
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
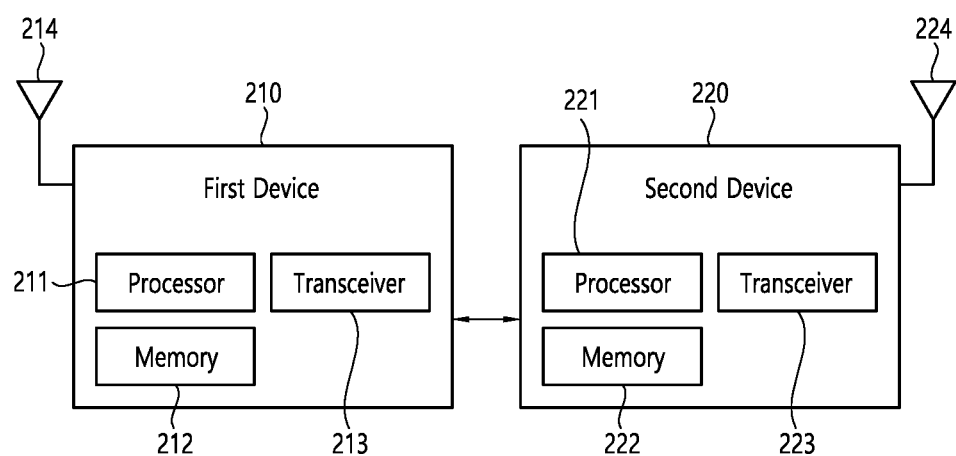
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
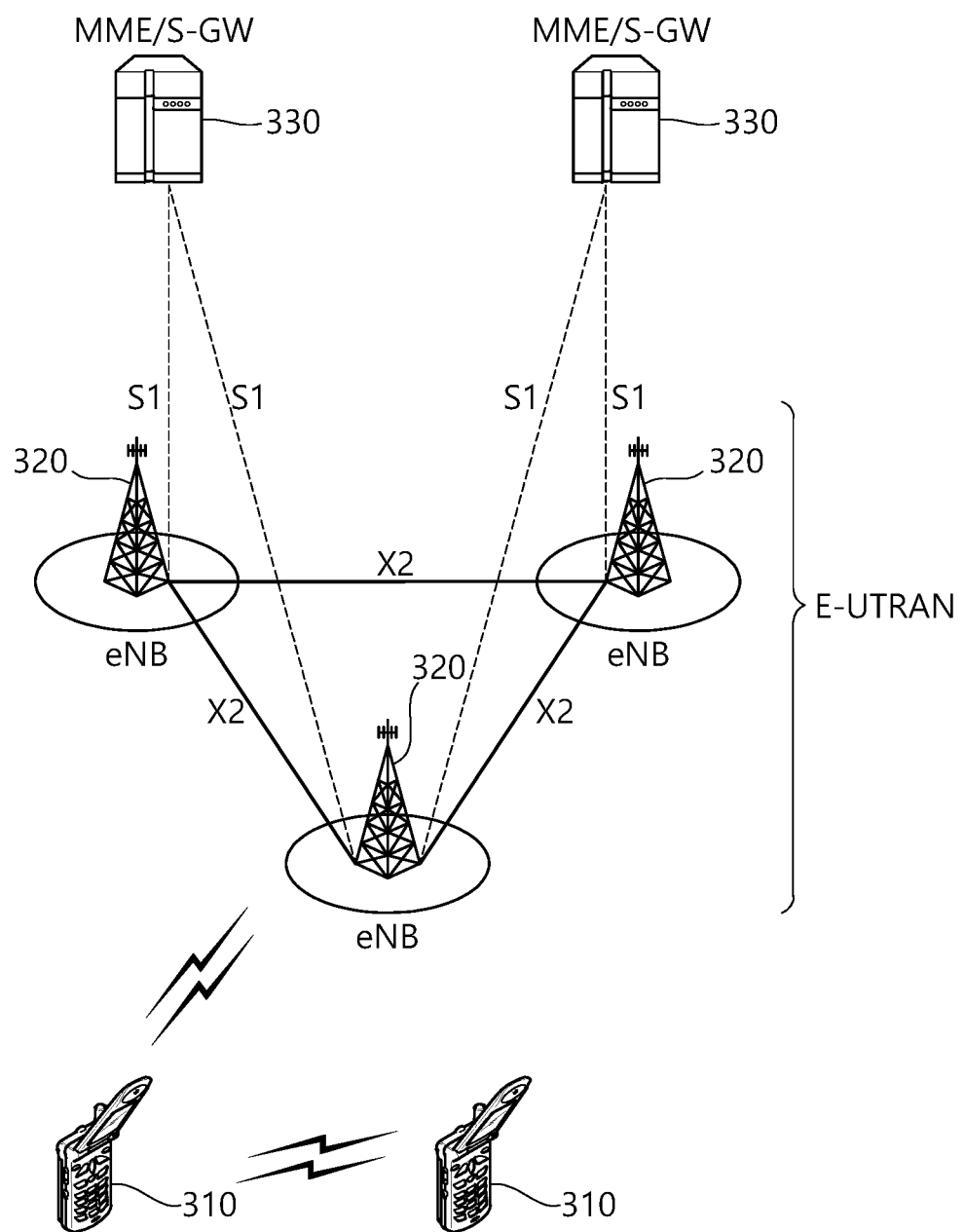
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UMTS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
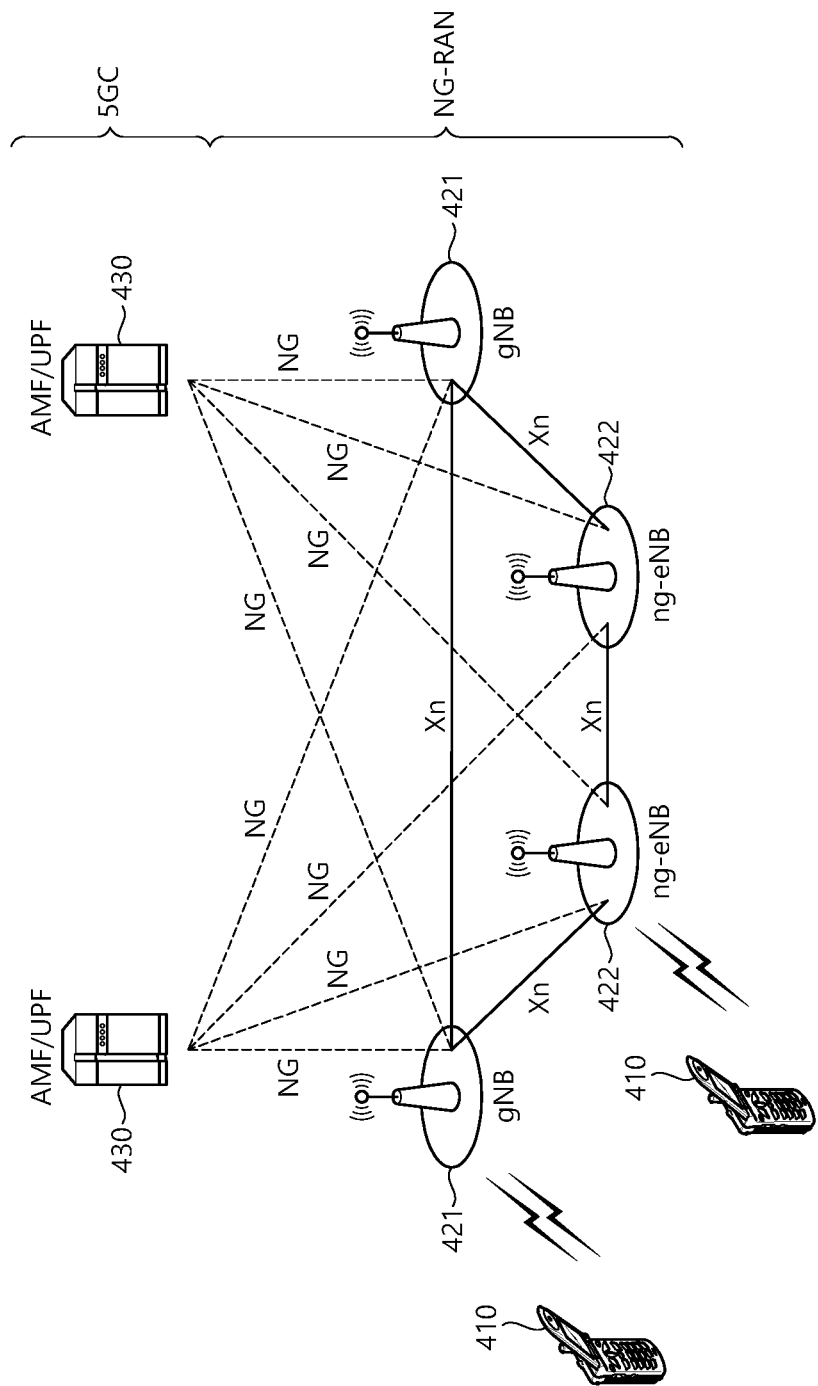
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
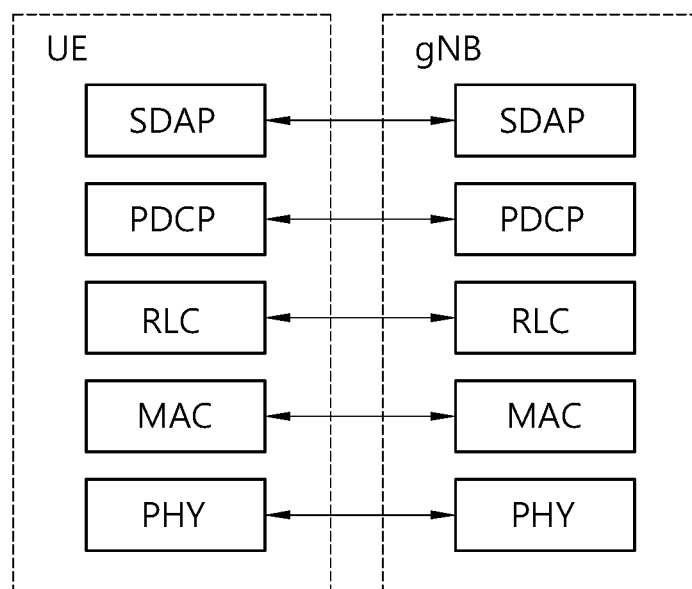
FIG. 5 shows a block diagram of a user plane protocol stack to which the technical features of the present disclosure can be applied.
Figure 6:
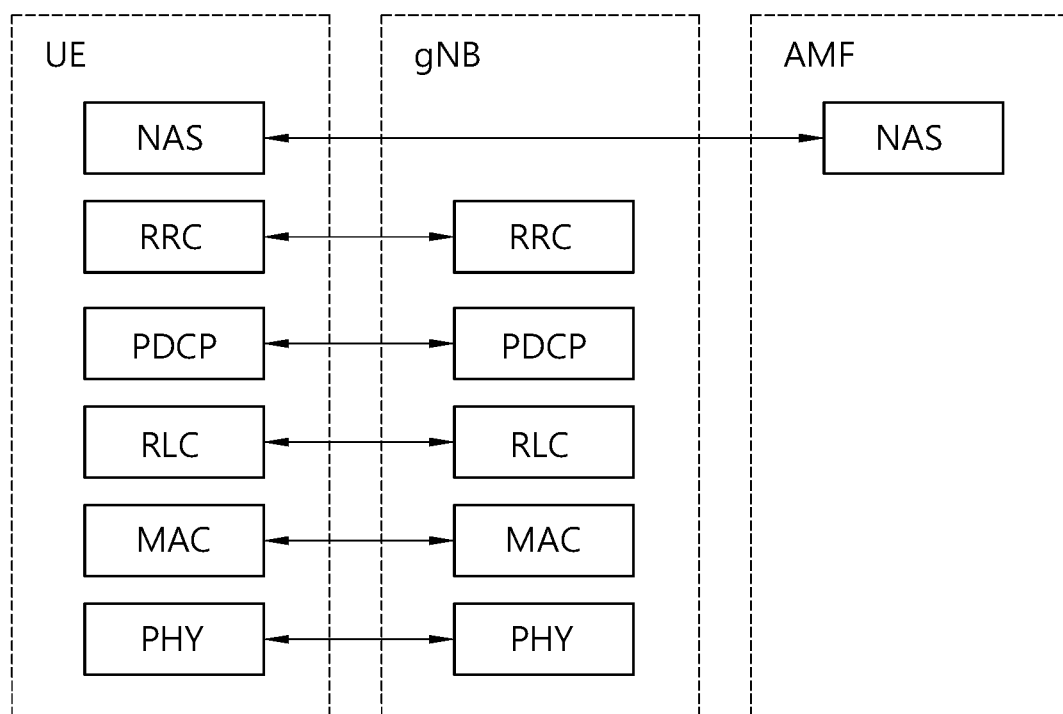
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signalling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH)

used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
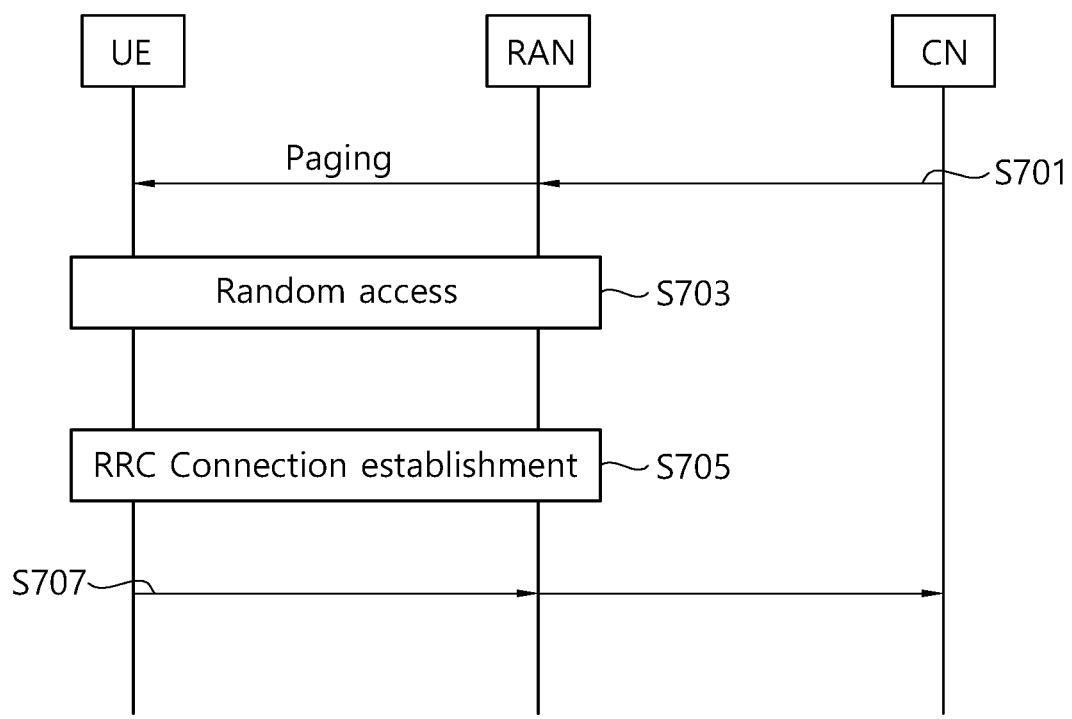
FIG. 7 shows an example of a paging procedure to which technical features of the present disclosure can be applied.

FIG. 7 shows an example of a paging procedure to which technical features of the present disclosure can be applied.

Referring to FIG. 7, in step S701, a core network (CN) node (e.g., mobility management entity (MME), and/or access and mobility management function (AMF) entity) transmits a signal for a paging, to the UE via the radio access network (RAN) node (e.g., eNB and/or gNB). For example, the UE may monitor a physical downlink control channel (PDCCH) addressed by a paging-radio network temporary identifier (P-RNTI) in a paging occasion, and receive a paging message in a corresponding physical downlink shared channel (PDSCH).

In step S703, the UE and the RAN node can perform a random access procedure. The random access procedure may be a contention-based random access procedure or a contention-free random access procedure, which will be further described in FIG. 8 and FIG. 9, respectively. For example, the UE may transmit a random access preamble (message1 or msg1) to the RAN node and receive a random access response (message2 or msg2) from the RAN node, for an uplink synchronization of the UE. Also, for the contention-based random access procedure, the UE may further transmit a device identification message (message3 or msg3) to the RAN node and receive a contention resolution message (message4 or msg4) from the RAN node, to be assigned a cell-level unique identifier (e.g., cell-radio network temporary identifier (C-RNTI)) for the UE.

In step S705, the UE and the RAN node may perform a radio resource control (RRC) connection establishment procedure. For example, the UE and the RAN node may exchange RRC signalings between them, to establish an RRC connection.

In step S707, the UE may transmit a paging response to the CN node via the RAN node. The paging response may be a response for the paging for requesting a RAN resource and/or a CN resource to transmit/receive data in a RRC_CONNECTED state. Initial NAS dedicated information/message (e.g., SERVICE_REQUEST message in NAS layer) can be transmitted from the UE to a network in this step.

Although it is illustrated in FIG. 7 that the random access procedure and the RRC connection establishment procedure are separated, some steps of the random access procedure and the RRC connection establishment procedure may overlap with each other—that is, some steps of the random access procedure may be related to RRC signalings to establish an RRC connection. For example, msg3 of the contention-based random access procedure may be included in RRCConnectionRequest message in the RRC connection establishment procedure, and msg4 of the contention-based random access procedure may be included in RRCConnectionSetup message in the RRC connection establishment procedure.

According to various embodiments, RRC state of the UE may be defined. The RRS state of the UE may be categorized as an RRC_CONNECTED, RRC_INACTIVE, and RRC_IDLE, which may be referred to as connected mode, inactive mode, and idle mode, respectively.

Figure 8:
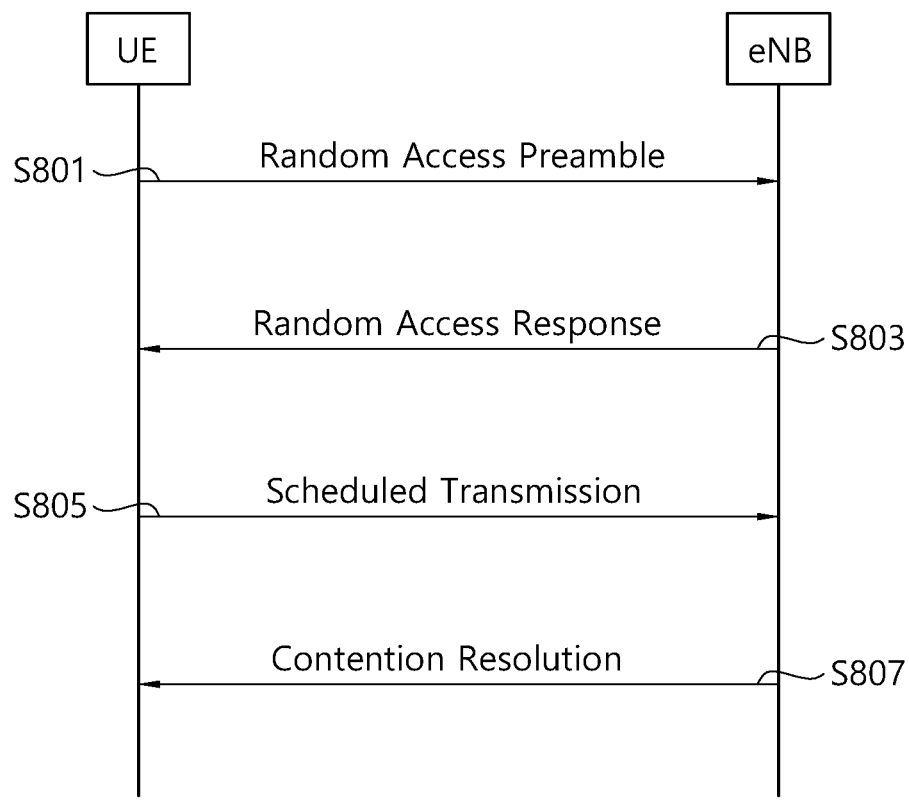
FIG. 8 shows an example of contention-based random access procedure to which technical features of the present disclosure can be applied.

FIG. 8 shows an example of contention-based random access procedure to which technical features of the present disclosure can be applied. The steps illustrated in FIG. 8 may be all or part of the step S703 in FIG. 7.

Referring to FIG. 8, in step S801, The UE may transmit a random access preamble (msg1) on RACH in uplink, to an evolved node B (eNB). There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.

In step S803, The UE may receive a random access response (msg2) generated by MAC on downlink-shared channel (DL-SCH), from the eNB. The random access response may be Semi-synchronous (within a flexible window of which the size is one or more transit time interval (TTI)) with the msg1. The random access response message comprises at least one of a random access preamble identifier, timing alignment information for a primary timing advance group (pTAG), initial uplink (UL) grant and assignment of temporary C-RNTI.

In step S805, the UE may transmit a device identification message (msg3) to the eNB. The device identification message may be a first scheduled UL transmission on UL-SCH. For initial access, the device identification message may comprise at least a NAS UE identifier. If the UE is in the RRC_CONNECTED state and has a C-RNTI, the device identification message may include the C-RNTI.

In step S807, the UE may receive a contention resolution message (msg4) from the eNB. The contention resolution message may be addressed to the temporary C-RNTI on PDCCH for initial access and after radio link failure, or addressed to the C-RNTI on PDCCH for UE in RRC_CONNECTED state. The temporary C-RNTI is promoted to C-RNTI for a UE which detects RA success and does not already have a C-RNTI. A UE which detects RA success and already has a C-RNTI resumes using the C-RNTI.

Figure 9:
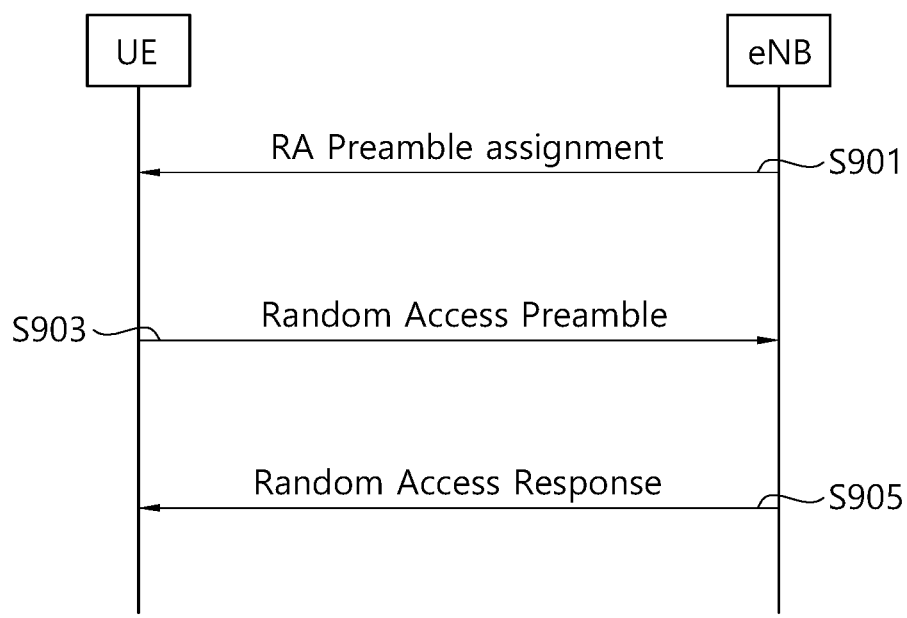
FIG. 9 shows an example of contention-free random access procedure to which technical features of the present disclosure can be applied.

FIG. 9 shows an example of contention-free random access procedure to which technical features of the present disclosure can be applied. The steps illustrated in FIG. 9 may be all or part of the step S703 in FIG. 7.

Referring to FIG. 9, in step S901, the UE may receive a random access preamble assignment via dedicated signalling in DL, from the eNB. The eNB may assign to UE a non-contention random access preamble (i.e., a random access preamble not within the set sent in broadcast signalling).

In step S903, the UE may transmit a random access preamble (msg1) on RACH in uplink, to the eNB. The UE transmits the assigned non-contention random access preamble.

In step S905, the UE may receive a random access response (msg2) on DL-SCH, from the eNB. The random access response message may comprise at least one of timing alignment information and UL grant for handover, timing alignment information for DL data arrival, or random access preamble identifier.

To optimize a support for infrequent small data packet transmission, a mechanism for data transmission during the random access procedure is specified for narrow band—internet of things (NB-IoT) and/or LTE-MTC (LTE-M). This mechanism, also referred to as early data transmission (EDT), improves the device battery life and reduces message latency.

According to various embodiments, EDT allows one uplink data transmission optionally followed by one downlink data transmission during the random access procedure. EDT is triggered when upper layers have requested the establishment or resumption of the RRC connection for mobile originated data (i.e., not signalling or SMS) and the uplink data size is less than or equal to a transport block (TB) size indicated in the system information. For example, EDT may be applicable to bandwidth reduced low complexity (BL) UEs, UEs in enhanced coverage and/or NB-IoT UEs.

According to various embodiments, a BL UE, UE in CE or NB-IoT UE can initiate EDT, if all or part of the following conditions 1)~6) are fulfilled:

1) For EDT for control plane CIoT optimizations (simply as CP-EDT), the upper layers request establishment of an RRC connection, the UE supports CP-EDT, and SystemInformationBlockType2 (SystemInformationBlockType2-NB in NB-IoT) includes CP-EDT; or 2) For EDT for user plane CIoT optimizations (simply as UP-EDT), the upper layers request resumption of an RRC connection, the UE supports UP-EDT, SystemInformationBlockType2 (SystemInformationBlockType2-NB in NB-IoT) includes up-EDT, and the UE has a stored value of the nextHopChainingCount provided in the RRCConnectionRelease message with suspend indication during the preceding suspend procedure;

3) The establishment or resumption request is for mobile originating calls and the establishment cause is mo-Data or mo-ExceptionData or delayTolerantAccess;

4) SystemInformationBlockType2 (SystemInformationBlockType2-NB in NB-IoT) includes edt-Parameters;

5) The size of the resulting MAC PDU including the total UL data is expected to be smaller than or equal to the TBS signalled in edt-TBS;

6) EDT fallback indication has not been received from lower layers for this establishment or resumption procedure.

Figure 10:
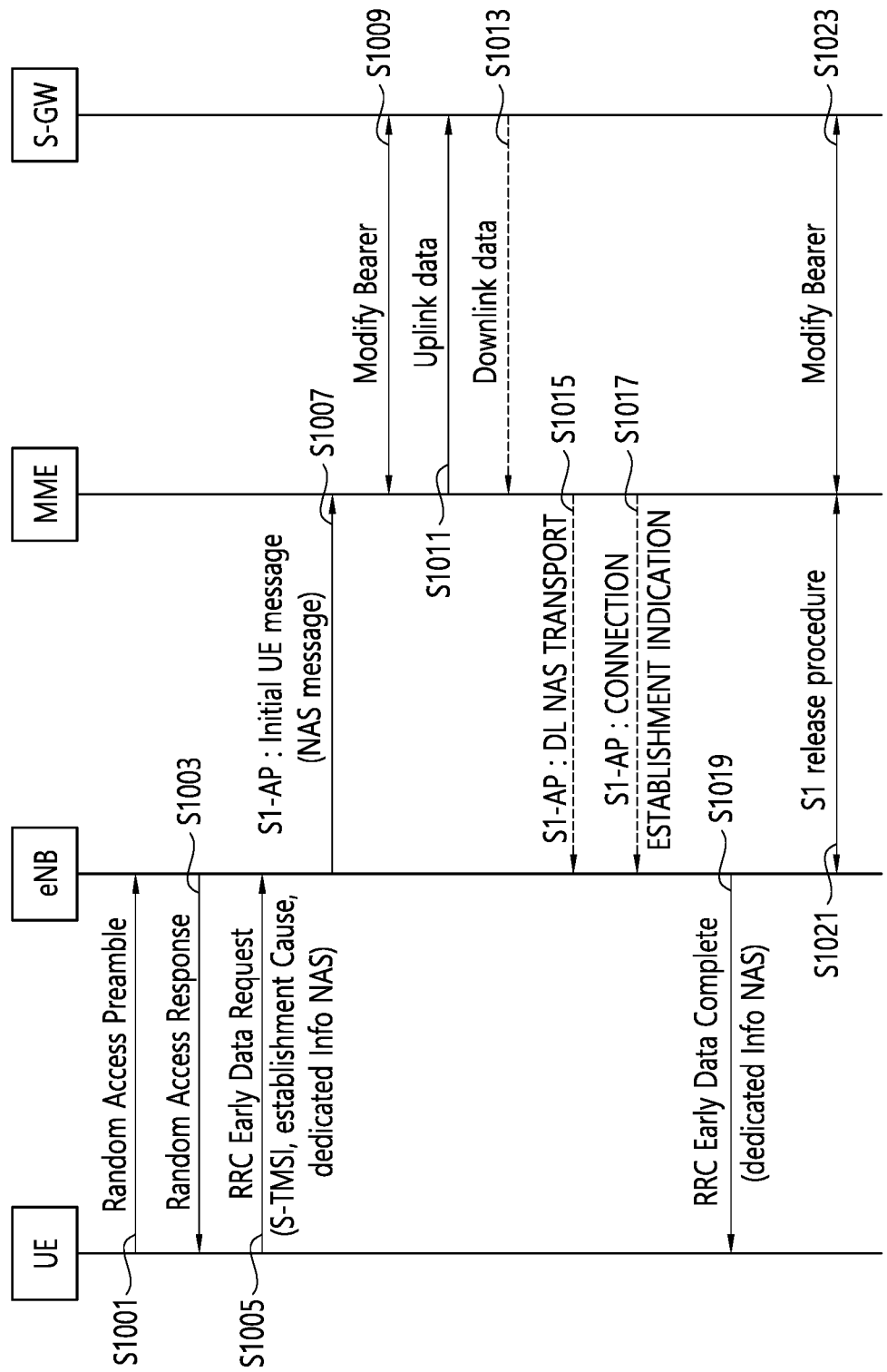
FIG. 10 shows an example of control plane (CP)-EDT (CP-EDT) procedure to which technical features of the present disclosure can be applied.

FIG. 10 shows an example of control plane (CP)-EDT (CP-EDT) procedure to which technical features of the present disclosure can be applied. For example, the CP-EDT procedure illustrated in FIG. 10 may comprise an EDT for CP cellular IoT (CIoT) EPS optimizations.

Referring to FIG. 10, in step S1001, the UE transmits a random access preamble to the eNB. Upon connection establishment request for mobile originated data from upper layers, the UE initiates EDT procedure and selects a random access preamble configured for the EDT.

In Step S1003, the UE may receive random access response from the eNB. The reception of the random access response may be similar to that of the step S803 or the step S905.

In step S1005, the UE sends RRCEarlyDataRequest message concatenating user data on common control channel (CCCH). The RRCEarlyDataRequest message may comprise, for example, at least one of S-TMSI, establishmentCause, and/or dedicatedInfoNas.

In step S1007, the eNB initiates the S1-AP Initial UE message procedure to forward the NAS message and establish the S1 connection. The eNB may indicate in this procedure that this connection is triggered for EDT.

In step S1009, the MME requests the S-GW to re-activate the EPS bearers for the UE.

In step S1011, the MME sends the uplink data to the S-GW.

In step S1013, if downlink data are available, the S-GW sends the downlink data to the MME.

*130 In step S1015, if downlink data are received from the S-GW, the MME forwards the data to the eNB via DL NAS transport procedure and may also indicate whether further data are expected. Otherwise, in step S1017, the MME may trigger Connection Establishment Indication procedure and also indicate whether further data are expected.

In step S1019, if no further data are expected, the eNB can send the RRCEarlyDataComplete message on CCCH to keep the UE in RRC_IDLE. If downlink data were received in step S1015, they are concatenated in RRCEarlyDataComplete message. For example, RRCEarlyDataComplete message may comprise dedicatedInfoNas concatenating the downlink data.

In step S1021, the S1 connection is released.

In step S1023, the EPS bearers are deactivated.

Figure 11:
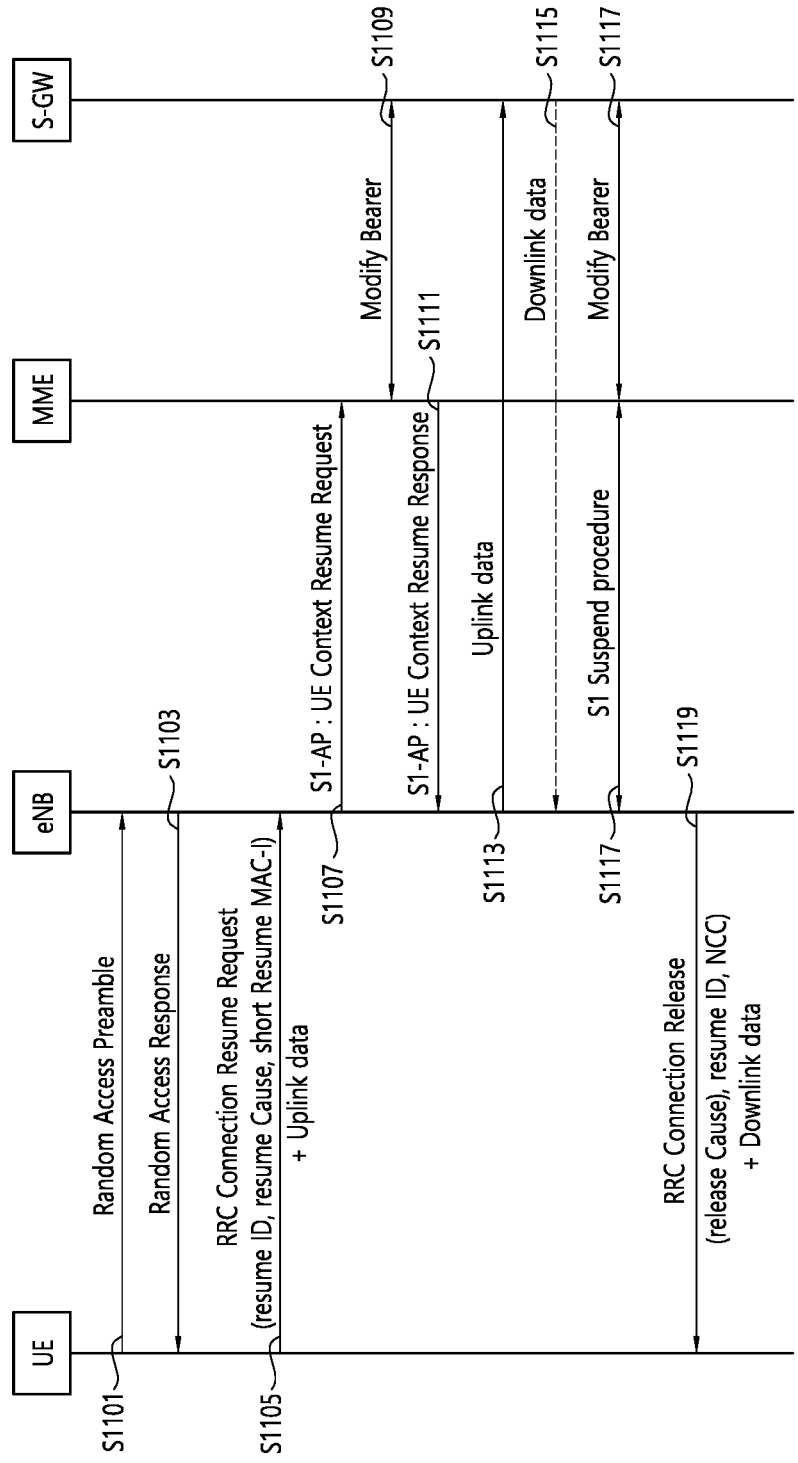
FIG. 11 shows an example of user plane (UP)-EDT (UP-EDT) procedure to which technical features of the present disclosure can be applied.

FIG. 11 shows an example of user plane (UP)-EDT (UP-EDT) procedure to which technical features of the present disclosure can be applied. For example, the UP-EDT procedure illustrated in FIG. 11 may comprise an EDT for UP cellular IoT (CIoT) EPS optimizations.

Referring to FIG. 11, in step S1101, the UE transmits a random access preamble to the eNB. Upon connection resumption request for mobile originated data from the upper layers, the UE initiates the early data transmission procedure and selects a random access preamble configured for EDT.

In step S1103, the UE receives a random access response from the eNB. The reception of the random access response may be similar to that of the step S803 or the step S905.

In step S1105, the UE sends an RRCConnectionResumeRequest message to the eNB, including its Resume ID, the establishment cause, and an authentication token. The UE resumes all SRBs and DRBs, derives new security keys using the NextHopChainingCount provided in the RRCConnectionRelease message of the previous connection and re-establishes the AS security. The user data are ciphered and transmitted on DTCH multiplexed with the RRCConnectionResumeRequest message on CCCH.

In step S1107, the eNB initiates the S1-AP Context Resume procedure to resume the S1 connection and re-activate the S1-U bearers.

In step S1109, the MME requests the S-GW to re-activate the S1-U bearers for the UE.

In step S1111, the MME confirms the UE context resumption to the eNB.

In step S1113, the uplink data are delivered to the S-GW.

In step S1115, if downlink data are available, the S-GW sends the downlink data to the eNB.

In step S1117, if no further data are expected from the S-GW, the eNB can initiate the suspension of the S1 connection and the deactivation of the S1-U bearers.

In step S1119, the eNB sends the RRCConnectionRelease message to keep the UE in RRC_IDLE. The message includes the releaseCause set to rrc-Suspend, the resumeID, the NextHopChainingCount and drb-ContinueROHC which are stored by the UE. If downlink data were received in step 6, they are sent ciphered on DTCH multiplexed with the RRCConnectionRelease message on DCCH.

According to various embodiments, there are some features related to EDP in the random access procedure. The example of such features are described below:

For example, in a random access resource selection, for BL UEs or UEs in enhanced coverage or NB-IoT UEs, if EDT is initiated by the upper layers, and i) if the message size (UL data available for transmission plus MAC header and, where required, MAC control elements) is larger than the TB size signalled in edt-TBS for the selected enhanced coverage level for EDT; or ii) if the PRACH resource associated with EDT for the selected enhanced coverage level is not available, the UE may indicate to upper layers that EDT is cancelled.

For example, for BL UEs or UEs in enhanced coverage, the UE may select the PRACH resource set corresponding to the selected enhanced coverage level. For EDT, the PRACH resource set shall correspond to the set associated with EDT for the selected enhanced coverage level.

For example, for BL UEs or UEs in enhanced coverage, if EDT is started, the UE may select the Random Access Preambles group corresponding to PRACH resource for EDT for the selected enhanced coverage level. Otherwise, if Random Access Preamble group B does not exist, the UE may select the Random Access Preambles group corresponding to the selected enhanced coverage level.

For example, for NB-IoT, the UE may randomly select one of the PRACH resources corresponding to the selected enhanced coverage level according to the configured probability distribution, and select the Random Access Preambles group corresponding to the PRACH resource and the support for multi-tone Msg3 transmission. A UE supporting multi-tone Msg3 shall only select the single-tone Msg3 Random Access Preambles group if there is no multi-tone Msg3 Random Access Preambles group. For EDT, the PRACH resource shall correspond to resource associated with EDT for the selected enhanced coverage level.

For example, when an uplink transmission is required, e.g., for contention resolution, the eNB should not provide a grant smaller than 56 bits (or 88 bits for NB-IoT) in the Random Access Response. For example, for EDT for CP CIoT EPS optimizations, the device identification message (msg3) may comprise at least one of the RRC Early Data Request generated by the RRC layer and transmitted via CCCH, or NAS UE identifier and user data concatenated in a NAS message.

For example, for EDT for User Plane CIoT EPS optimizations, the device identification message (msg3) may comprise at least one of the RRC Resume Request generated by the RRC layer and transmitted via CCCH, a Resume ID to resume the RRC connection, or ciphered user data transmitted via DTCH.

Figure 12:
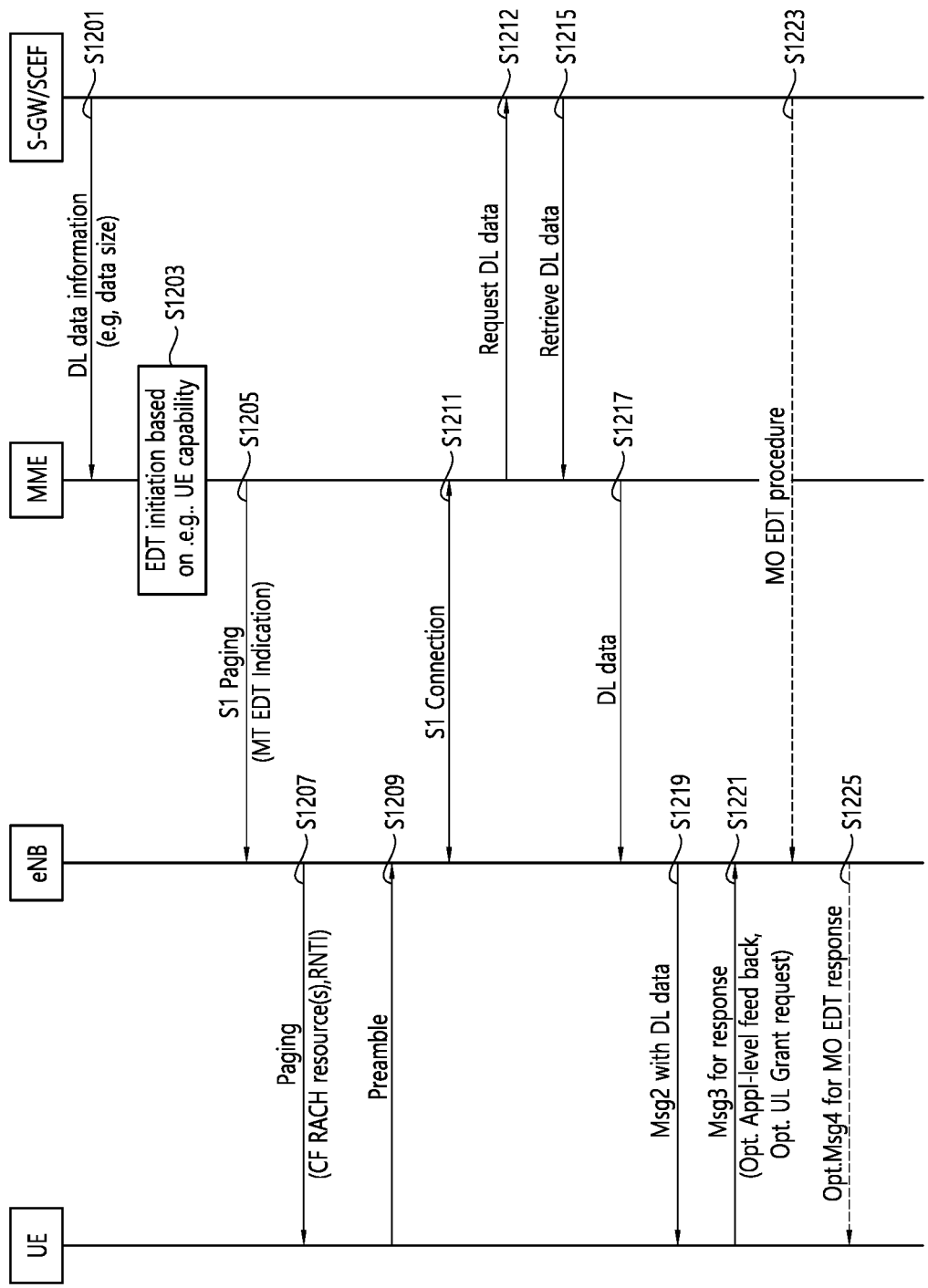
FIG. 12 shows an example of signalling flows for MT EDT procedure to which technical features of the present disclosure can be applied.

FIG. 12 shows an example of signalling flows for MT EDT procedure to which technical features of the present disclosure can be applied. The MT EDT procedure illustrated in FIG. 12 may be a msg2 based MT EDT procedure.

Referring to FIG. 12, in step S1201, S-GW and/or service capability exposure function (SCEF) may transmit DL data information to MME. The DL data information may comprise information related to DL data, such as data size of the DL data.

In step S1203, the MME initiates MT EDT. The EDT initiation can be based on, for example, UE capability.

In step S1205, the MMT transmits S1 paging signal to eNB. The S1 paging signal may comprise MT EDT indication. The eNB may decide wither MT EDT is used for not.

In step S1207, if the eNB decides to use MT EDT, the eNB may transmit a paging signal to UE. The paging signal may comprise contention-free (CF) RACH resource and/or RNTI (e.g., C-RNTI) for msg2 reception. Another MT EDT indication or the indication to distinguish CP solution and UP solution is not required. If the eNB does not use MT EDT, the eNB performs legacy procedures.

Upon reception of the paging signal, if the ue-Identity (e.g., system architecture evolution—temporary mobile subscription identifier (S-TMSI)) included in the PagingRecord matches with the UE identity allocated by upper layers and MT EDT related parameters are included in the paging signal, the UE informs to upper layers that MT EDT is initiated by the network. For CP solution, the UE NAS layer may perform NAS security setup (this may initiate the security functions in the NAS layer).

In step S1209, if the UE does not have pending UL data, the UE transmits random access preamble using the dedicated PRACH resource.

In step S1211, as soon as the eNB detects the random access preamble, the eNB knows of the access by the UE and establishes/resumes S1 connection with the MME.

In step S1213, the MME requests DL data to the S-GW/SCEF.

In step S1215, the MME receives DL data from the S-GW/SCEF.

In step S1217, the eNB receives DL data from a core network (e.g., MME).

In S1219, the eNB transmits msg2 with the DL data to the UE. For CP solution, the eNB sends msg2 including dedicatedNASInfo (or, dedicatedInfoNAS) including the DL data. For UP solution, the eNB sends msg2 and DL data in dedicated traffic channel (DTCH).

Upon reception of msg2 with DL data, the UE validates the msg2 security protection. For CP solution, the UE uses NAS security for DL data security validation. Otherwise, the UE uses AS security.

In step S1221, if the UE has pending UL data applicable for EDT, the UE needs to request UL grant at this point to transmit the pending MO data in msg3. For this case, the eNB allocates another dedicated PRACH resource to the UE in the paging signal. Also, the UE may send UL feedback via RRC signalling in msg3 regardless of an application level UL feedback.

In step S1223, the eNB and S-GW/SCEF may perform an MO EDT procedure.

In step S1225, the UE may receive msg4 for MO EDT response.

As shown above, after a UE receives a paging from a network, the UE sends back paging response to the network. However, in EDT, there may be a case the core network may not need paging response when the core network sends CN paging (i.e., paging initiated by core network). The purpose of the paging for mobile terminated (MT) EDT is to send small DL data to the UE. Therefore, once the data transmission can be successfully performed, the network is not required to receive paging response via the same layer, which may be a NAS layer in CN paging. Also, if the network does not require acknowledgement (ACK) for DL data, the core network does not need to wait for any response if DL data is properly delivered to the RAN node.

Therefore, depending on the requirement of the core network (possibility based on the requirements of EDT applications), the UE may be configured to generate NAS paging response for CN paging and/or NAS ACK for DL user data.

According to various embodiments, a UE may decide whether the UE sends initial NAS message for CN paging response and/or ACK for DL user data optionally after state transition based on a configuration. The configuration may comprise at least one of a pre-configuration as a subscription information of the UE, a configuration indicated in paging, or a configuration indicated in a dedicated signalling including DL user data.

According to various embodiments, if a UE is configured to send ACK for DL user data, a response message that the UE sends upon reception of DL data may include NAS PDU. The UE may receive paging including CN UE ID. The UE may be configured to use NAS PDU to send uplink data and/or receive downlink user data. The UE may not respond to the core network for CN paging.

According to various embodiments, a UE is configured to use NAS PDU to transmit uplink data and/or receive downlink user data. A UE may be configured to send ACK for DL data. A requirement of ACK for DL user data may be i) pre-configured as subscription information of the UE, ii) configured in paging, and/or iii) indicated in a dedicated signalling including DL user data.

Figure 13:
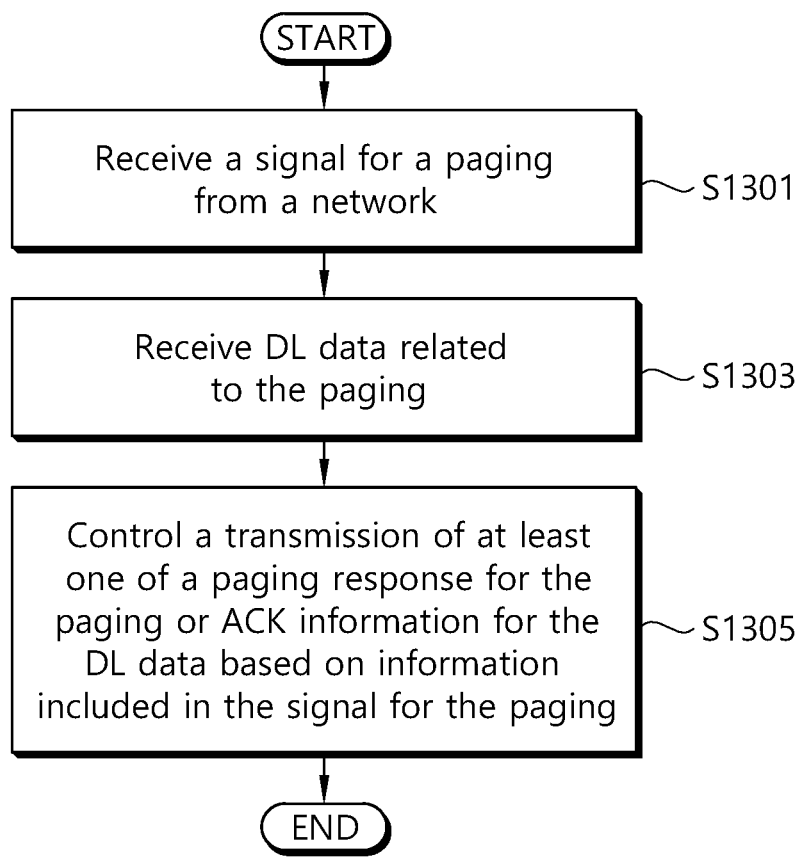
FIG. 13 shows an example of a method for controlling a transmission of a response signal according to an embodiment of the present disclosure.

FIG. 13 shows an example of a method for controlling a transmission of a response signal according to an embodiment of the present disclosure. The method may be performed by a UE.

Referring to FIG. 13, in step S1301, the UE may receive a signal for a paging from a network. For example, the UE may monitor a PDCCH addressed by P-RNTI in paging occasion, and may receive a paging message in a corresponding PDSCH. According to various embodiments, the paging may be initiated by CN—that is, the paging may be CN paging.

In step S1303, the UE may receive DL data related to the paging. For example, the UE may receive the DL data which caused the paging.

In step S1305, the UE may control a transmission of at least one of a paging response for the paging or ACK information for the DL data based on information included in the signal for the paging. That is, a transmission of at least one of a paging response for the paging or ACK information for the DL data is determined based on information included in the signal for the paging. If the paging response or the ACK information is transmitted, the paging response or the ACK information may be transmitted via a NAS PDU (i.e., NAS PDU may include the paging response or the ACK information and be transmitted). Further, the ACK information may comprise ACK for the DL data if the received DL data is successfully decoded, or negative-acknowledgement (NACK) for the DL data if the received DL data fails to be decoded.

According to various embodiments, the information included in the signal for the paging may also be referred to as a response configuration, or simply a configuration. The information (or response configuration) may comprise at least one of a first information element indicating whether to transmit the paging response for the paging, or a second information element indicating whether to transmit the ACK information for the DL data.

According to various embodiments, the response configuration may include the first information element, and the first information element may be set to indicate to transmit the paging response for the paging. In this case, the UE may identify the first information element in the response configuration, and transmit the paging response for the paging to the network as indicated by the first information element.

According to various embodiments, the response configuration may comprise the second information element, and the second information element may be set to indicate to transmit the ACK information for the DL data. In this case, the UE may identify the second information element in the response configuration, and transmit the ACK information for the DL data to the network as indicated by the second information element.

According to various embodiments, the response configuration may comprise the first information element and the second information element, and the first information element may be set to indicate not to transmit the paging response for the paging while the second information element may be set to indicate to transmit the ACK information for the DL data. In this case, the UE may transmit the ACK information for the DL data, and in response to the transmission, the UE may transit to an idle mode without receiving a RRC connection release message from the network. The paging response for the paging may not be transmitted as indicated by the first information element.

According to various embodiments, the response configuration may comprise the first information element, and the first information element may be set to indicate not to transmit the paging response for the paging. In this case, the UE may identify the first information element in the response configuration, and control not to transmit the paging response for the paging as indicated by the first information element.

According to various embodiments, the response configuration may comprise the second information element, and the second information element may be set to indicate not to transmit the ACK information for the DL data. In this case, the UE may control not to transmit the ACK information as indicated by the second information element while maintaining an RRC state of the UE as an idle mode or an inactive mode.

According to various embodiments, the UE may transit to a connected mode in response to receiving the DL data.

According to various embodiments, in response to receiving the signal for the paging, the UE may transmit a random access preamble for a random access procedure, and receive a NAS PDU comprising the DL data during the random access procedure. That is, the DL data related to the paging may be received via the NAS PDU. This may correspond to MT EDT.

According to various embodiments, the random access procedure may comprise a contention-free random access procedure. In this case, after transmitting the random access preamble, the UE may receive a message related to a random access response (e.g., msg2) comprising the NAS PDU. If the second information element in the response configuration indicates to transmit the ACK information for the DL data, the ACK information for the DL data is transmitted to the network after the contention-free random access procedure. On the other hand, if the second information element indicates not to transmit the ACK information for the DL data, the ACK information for the Dl data may not be transmitted while maintain an RRC state of the UE as an idle mode or an inactive mode. Also, if the first information element in the response configuration indicates to transmit the paging response for the paging, the paging response may be transmitted to the network, and the paging response and the ACK information are transmitted in the same message.

According to various embodiments, the random access procedure may comprise a contention-based random access procedure. In this case, after transmitting the random access preamble, the UE may receive a random access response, transmit a message (msg3) comprising an identifier of the UE during the contention-based random access procedure, and receive a contention resolution message (msg4) for the random access procedure. The contention resolution message may comprise the NAS PDU comprising the DL data—that is, NAS PDU including the DL data is transmitted via the contention resolution message. If the second information element indicates to transmit the ACK information for the DL data, the ACK information is transmitted to the network after the contention-based random access procedure. On the other hand, if the second information element indicates not to transmit the ACK information for the DL data, the ACK information may not be transmitted while maintaining a RRC state of the UE as an idle mode or an inactive mode. Also, if the first information element in the response configuration indicates to transmit the paging response for the paging, the paging response may be transmitted to the network through the msg3. That is, the msg3 may comprise the paging response when transmitted.

Though it is illustrated in FIG. 13 that the response configuration is included in the signal for the paging, the configuration may be a pre-configuration as subscription information of the UE, or a configuration indicated in a dedicated signaling including the DL data.

Figure 14:
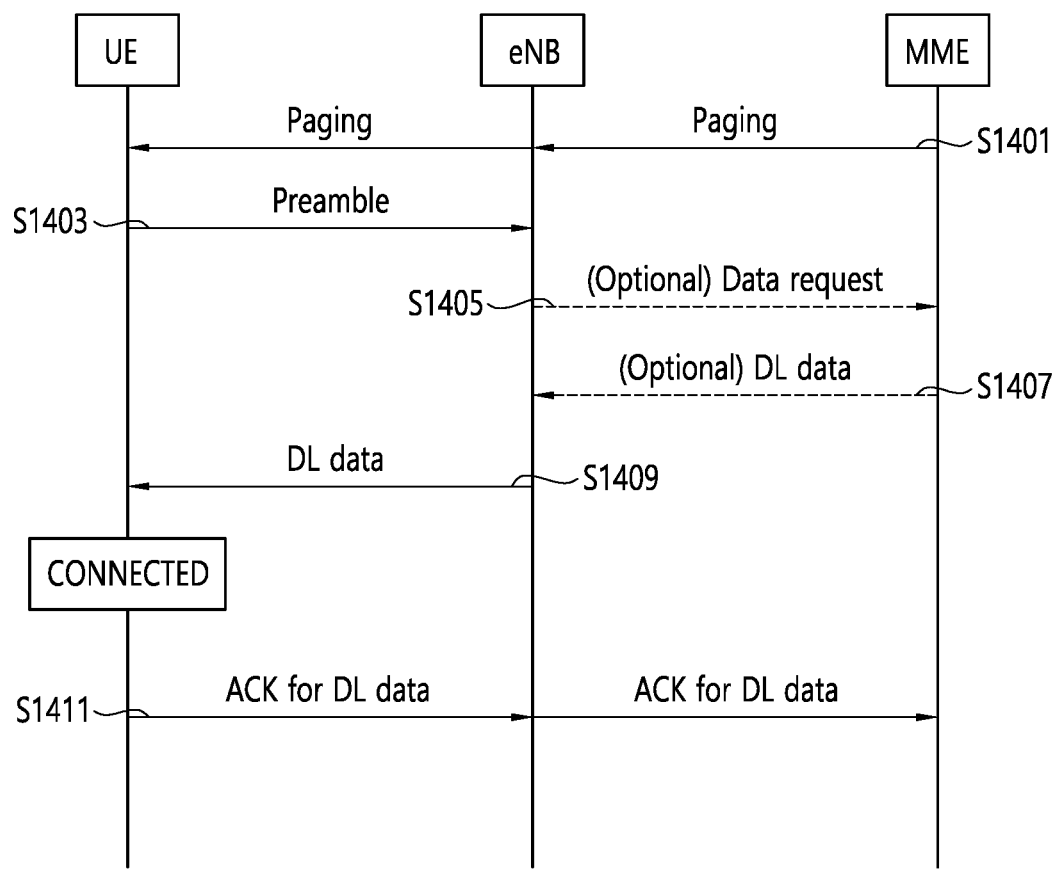
FIG. 14 shows an exemplary diagram for a procedure of response signal transmission in case of a contention-free random access according to an embodiment of the present disclosure.

FIG. 14 shows an exemplary diagram for a procedure of response signal transmission in case of a contention-free random access according to an embodiment of the present disclosure.

Referring to FIG. 14, in step S1401, the UE may receive a signal for a paging (or simply a paging signal) from an MME via eNB. The paging may be a CN paging. If a response configuration such as NAS paging response indication (i.e., first information element indicating whether to transmit a paging response for the paging) and/or a requirement of ACK for DL data (i.e., second information element indicating whether to transmit ACK information for DL data) is included in the paging signal, the UE may store the response configuration.

In step S1403, upon reception of the paging, if dedicated preamble is configured and/or assigned, the UE sends dedicated preamble in msg1.

In step S1405, the eNB requests DL data to the MME, and in step S1407, the eNB receives DL data from the MME. The steps S1405 and S1407 are optionally performed if the RAN node (i.e., eNB) does not have DL data for the UE.

In step S1409, the UE may receive NAS PDU including the DL data in msg2.

In step S1411, if the UE receives NAS PDU in msg2, the UE may generate ACK information for DL data in a NAS PDU, if ACK information for DL data is required (i.e., the second information elements in a response configuration of the paging signal indicates to transmit the ACK information for DL data). If the UE is idle mode, the UE may transit to connected mode and send an RRC message (e.g., ULInformationTransfer or RRCConnectionSetupComplete) comprising dedicatedInfoNAS. The dedicatedInfoNAS may comprise a NAS PDU comprising the ACK information for the DL data. If the UE is in inactive mode, the UE may send an RRC message (e.g., RRCEarlyDataRequest) comprising a NAS PDU including the ACK information for the DL data, without state transition. That is, if the UE is in inactive mode, the UE may send the RRC message while maintaining the RRC state of the UE as the inactive mode, without transitioning to a connected mode. The RAN node (i.e., eNB) may bypass the ACK information included in the dedicatedInfoNAS and/or RRCEarlyDataRequest, or transmit the ACK information as an S1AP parameter to the CN (i.e., MME).

According to various embodiments, in response to transmitting the ACK information for the DL data, the UE may transit to RRC_IDLE without explicit RRC connection release. For example, in response to transmitting the ACK information for the DL data, the UE may transit to RRC_IDLE without receiving a RRC connection release message from a network.

According to various embodiments, the first information element in the response configuration of the paging signal may indicate to transmit the paging response for the paging. In this case, NAS PDU including the paging response for the paging may be included in dedicatedInfoNAS of the ULInformationTransfer or RRCConnectionSetupComplete, or be included in the RRCEarlyDataRequest.

Figure 15:
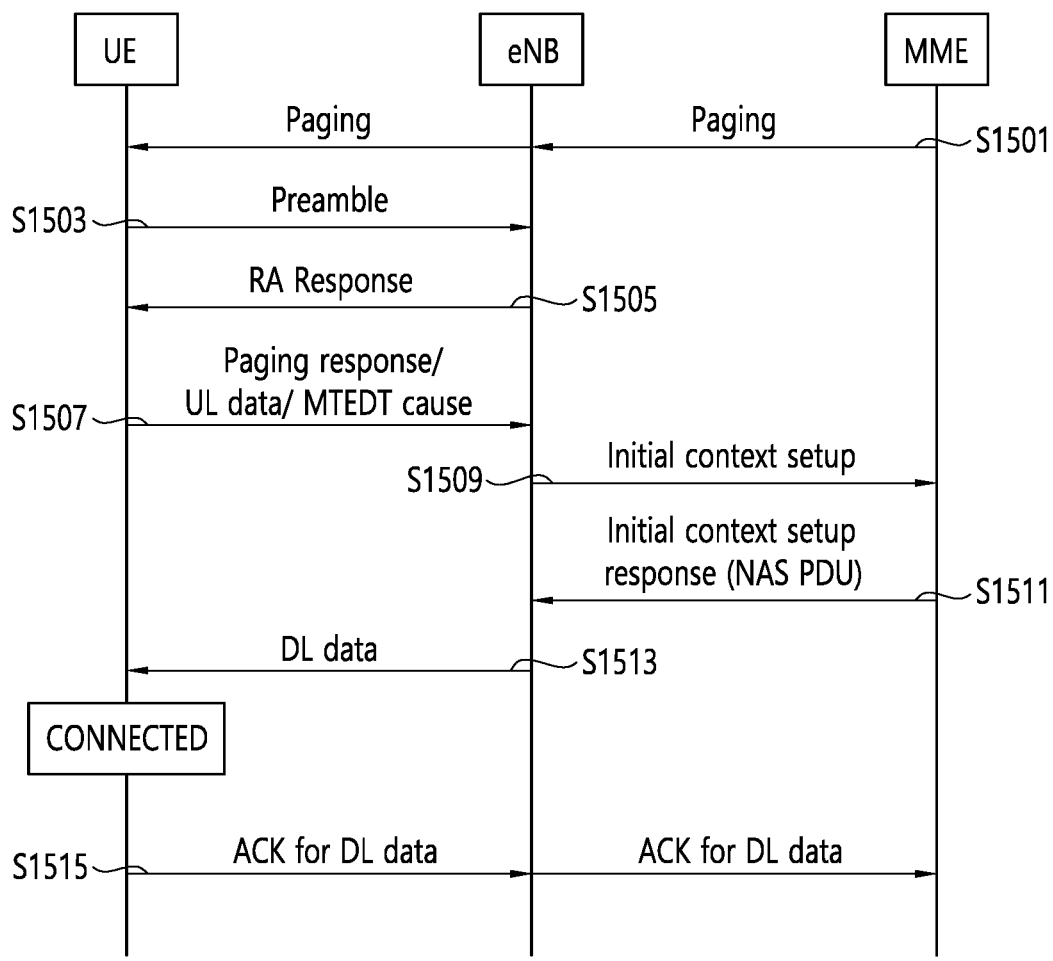
FIG. 15 shows an exemplary diagram for a procedure of response signal transmission in case of a contention-based random access according to an embodiment of the present disclosure.

FIG. 15 shows an exemplary diagram for a procedure of response signal transmission in case of a contention-based random access according to an embodiment of the present disclosure.

Referring to FIG. 15, in step S1501, the UE may receive a paging signal from the MME via the eNB. The paging may be a CN paging. If a response configuration such as NAS paging response indication (i.e., first information element indicating whether to transmit a paging response for the paging) and/or a requirement of ACK for DL data (i.e., second information element indicating whether to transmit ACK information for DL data) is included in the paging signal, the UE may store the response configuration.

In step S1503, upon reception of the CN paging, the UE may send a preamble in msg1. The UE may check whether the UE has pending mobile originated (MO) data. If conditions or pre-conditions for MO EDT are met, the UE may send EDT preamble in msg1. Otherwise, the UE may send random access preamble.

In step S1505, the UE may receive random access response in msg2.

In step S1507, upon reception of the random access response in msg2, if MO EDT conditions are met, the UE may send an RRC message (e.g., RRCEarlyDataRequest or RRCConnectionRequest) in msg3 comprising at least one of UL data or indication for MT EDT. According to various embodiments, if the response configuration comprises a first information element indicating to transmit a paging response for the paging, the RRC message may further comprise a NAS PDU including the paging response for the paging. The NAS PDU may be included in dedicatedInfoNAS of the RRC message. Also, the RRC message may optionally include NAS PDU including the UL data. Upon reception of the random access response in msg2, if the first information element in the response configuration indicates not to transmit the paging response for the paging, the UE may send a RRC message (e.g., RRCEarlyDataRequest or RRCConnectionRequest) without dedicatedInfoNAS with MT EDT cause, and/or without NAS PDU comprising the paging response for the paging with MT EDT cause.

In step S1509, the eNB may transmit initial context setup message to the MME, and in step S1511, the eNB may receive initial context setup response via NAS PDU.

In step S1513, the UE may receive NAS PDU including DL data in msg4. Upon reception of msg4 with DL data, the UE may generate ACK information for DL data in a NAS PDU, if ACK information for DL data is required (i.e., the second information elements in a response configuration indicates to transmit the ACK information for DL data).

In step S1515, if the UE is idle mode, the UE may transit to connected mode and send an RRC message (e.g., ULInformationTransfer or RRCConnectionSetupComplete) comprising dedicatedInfoNAS. The dedicatedInfoNAS may comprise a NAS PDU comprising the ACK information for the DL data. If the UE is in inactive mode, the UE may send an RRC message (e.g., RRCEarlyDataRequest) comprising a NAS PDU including the ACK information for the DL data, without state transition. That is, if the UE is in inactive mode, the UE may send the RRC message while maintaining the RRC state of the UE as the inactive mode, without transitioning to a connected mode. The RAN node (i.e., eNB) may bypass the ACK information included in the dedicatedInfoNAS and/or RRCEarlyDataRequest, or transmit the ACK information as an S1AP parameter to the CN (i.e., MME).

According to various embodiments, in response to transmitting the ACK information for the DL data, the UE may transit to RRC_IDLE without explicit RRC connection release. For example, in response to transmitting the ACK information for the DL data, the UE may transit to RRC_IDLE without receiving a RRC connection release message from a network.

In the above description, the eNB/MME are exemplarily described as RAN node/core network node respectively, i.e., RAN node/core network node of 4G LTE/LTE-A. The present disclosure is not limited thereto, the RAN node/core network node may include gNB/AMF respectively, i.e., RAN node/core network node of 5G NR.

Figure 16:
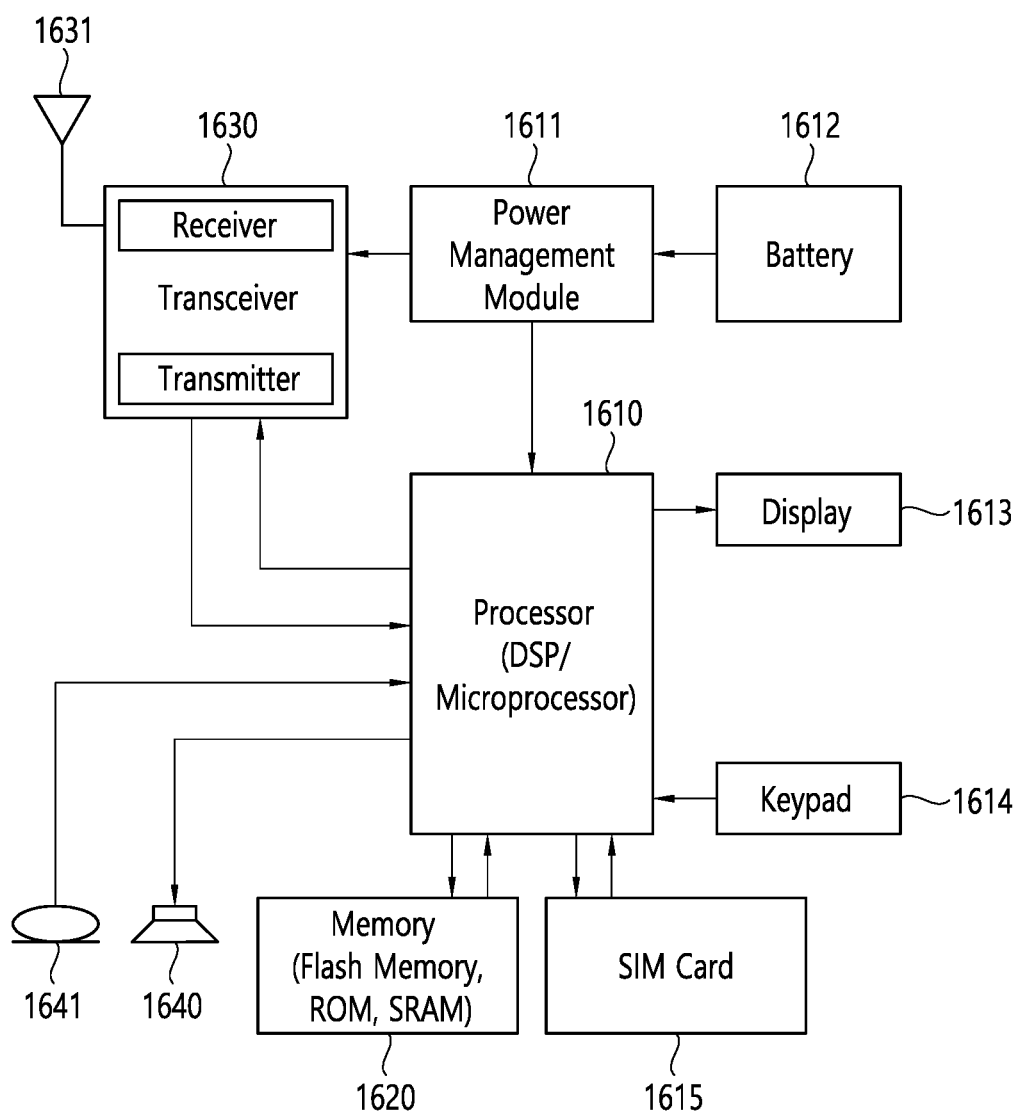
FIG. 16 shows a UE to implement an embodiment of the present disclosure.

FIG. 16 shows a UE to implement an embodiment of the present disclosure. The present disclosure described above for UE side may be applied to this embodiment.

A UE includes a processor 1610, a power management module 1611, a battery 1612, a display 1613, a keypad 1614, a subscriber identification module (SIM) card 1615, a memory 1620, a transceiver 1030, one or more antennas 1631, a speaker 1640, and a microphone 1641.

The processor 1610 may be configured to implement proposed functions, procedures and/or methods described in this description. Layers of the radio interface protocol may be implemented in the processor 1610. The processor 1610 may include application-specific integrated circuit (ASIC), other chipset, logic circuit and/or data processing device. The processor 1610 may be an application processor (AP). The processor 1610 may include at least one of a digital signal processor (DSP), a central processing unit (CPU), a graphics processing unit (GPU), a modem (modulator and demodulator). An example of the processor 1610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1610 may be configured to, or configured to control one or more other components of the UE (e.g., a power management module 1611, a battery 1612, a display 1613, a keypad 1614, a subscriber identification module (SIM) card 1615, a memory 1620, a transceiver 1030, one or more antennas 1631, a speaker 1640, and/or a microphone 1641) to implement a method performed by the UE according to various embodiments of the present disclosure.

The processor 1610 may be configured to perform steps shown in FIGS. 7-15. Or, the processor 1610 may be configured to control the memory 1620 and/or the transceiver 1630 to perform steps shown in FIGS. 7-15.

The power management module 1611 manages power for the processor 1610 and/or the transceiver 1030. The battery 1612 supplies power to the power management module 1611. The display 1613 outputs results processed by the processor 1610. The keypad 1614 receives inputs to be used by the processor 1610. The keypad 1614 may be shown on the display 1613. The SIM card 1615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1620 is operatively coupled with the processor 1610 and stores a variety of information to operate the processor 1610. The memory 1620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1620 and executed by the processor 1610. The memory 1620 can be implemented within the processor 1610 or external to the processor 1610 in which case those can be communicatively coupled to the processor 1610 via various means as is known in the art.

The transceiver 1030 is operatively coupled with the processor 1610, and transmits and/or receives a radio signal. The transceiver 1030 includes a transmitter and a receiver. The transceiver 1030 may include baseband circuitry to process radio frequency signals. The transceiver 1030 controls the one or more antennas 1631 to transmit and/or receive a radio signal.

The speaker 1640 outputs sound-related results processed by the processor 1610. The microphone 1641 receives sound-related inputs to be used by the processor 1610.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 17:
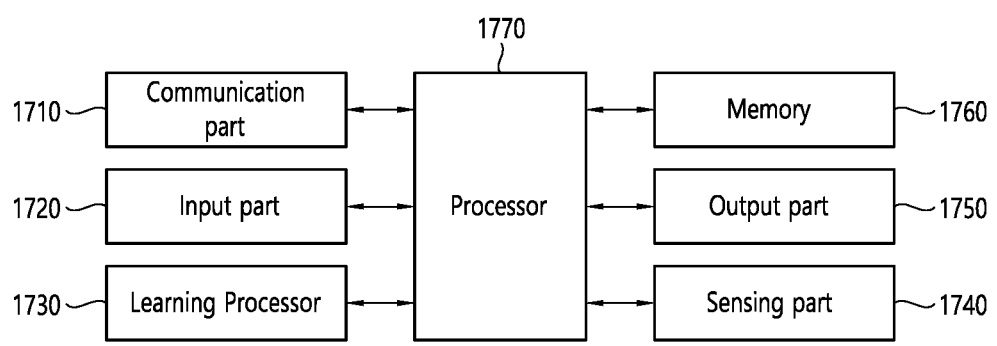
FIG. 17 shows an example of an AI device to which the technical features of the present disclosure can be applied.

FIG. 17 shows an example of an AI device to which the technical features of the present disclosure can be applied.

The AI device 1100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 17, the AI device 1100 may include a communication part 1710, an input part 1720, a learning processor 1730, a sensing part 1740, an output part 1750, a memory 1760, and a processor 1770.

The communication part 1710 can transmit and/or receive data to and/or from external devices such as the AI devices and the AI server using wire and/or wireless communication technology. For example, the communication part 1710 can transmit and/or receive sensor information, a user input, a learning model, and a control signal with external devices. The communication technology used by the communication part 1710 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1720 can acquire various kinds of data. The input part 1720 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1720 can acquire input data to be used when acquiring an output using learning data and a learning model for model learning. The input part 1720 may obtain raw input data, in which case the processor 1770 or the learning processor 1730 may extract input features by preprocessing the input data.

The learning processor 1730 may learn a model composed of an ANN using learning data. The learned ANN can be referred to as a learning model. The learning model can be used to infer result values for new input data rather than learning data, and the inferred values can be used as a basis for determining which actions to perform. The learning processor 1730 may perform AI processing together with the learning processor of the AI server. The learning processor 1730 may include a memory integrated and/or implemented in the AI device 1100. Alternatively, the learning processor 1730 may be implemented using the memory 1760, an external memory directly coupled to the AI device 1100, and/or a memory maintained in an external device.

The sensing part 1740 may acquire at least one of internal information of the AI device 1100, environment information of the AI device 1100, and/or the user information using various sensors. The sensors included in the sensing part 1740 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1750 may generate an output related to visual, auditory, tactile, etc. The output part 1750 may include a display unit for outputting visual information, a speaker for outputting auditory information, and/or a haptic module for outputting tactile information.

The memory 1760 may store data that supports various functions of the AI device 1100. For example, the memory 1760 may store input data acquired by the input part 1720, learning data, a learning model, a learning history, etc.

The processor 1770 may determine at least one executable operation of the AI device 1100 based on information determined and/or generated using a data analysis algorithm and/or a machine learning algorithm. The processor 1770 may then control the components of the AI device 1100 to perform the determined operation. The processor 1770 may request, retrieve, receive, and/or utilize data in the learning processor 1730 and/or the memory 1760, and may control the components of the AI device 1100 to execute the predicted operation and/or the operation determined to be desirable among the at least one executable operation. The processor 1770 may generate a control signal for controlling the external device, and may transmit the generated control signal to the external device, when the external device needs to be linked to perform the determined operation. The processor 1770 may obtain the intention information for the user input and determine the user's requirements based on the obtained intention information. The processor 1770 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1730 and/or learned by the learning processor of the AI server, and/or learned by their distributed processing. The processor 1770 may collect history information including the operation contents of the AI device 1100 and/or the user's feedback on the operation, etc. The processor 1770 may store the collected history information in the memory 1760 and/or the learning processor 1730, and/or transmit to an external device such as the AI server. The collected history information can be used to update the learning model. The processor 1770 may control at least some of the components of AI device 1100 to drive an application program stored in memory 1760. Furthermore, the processor 1770 may operate two or more of the components included in the AI device 1100 in combination with each other for driving the application program.

Figure 18:
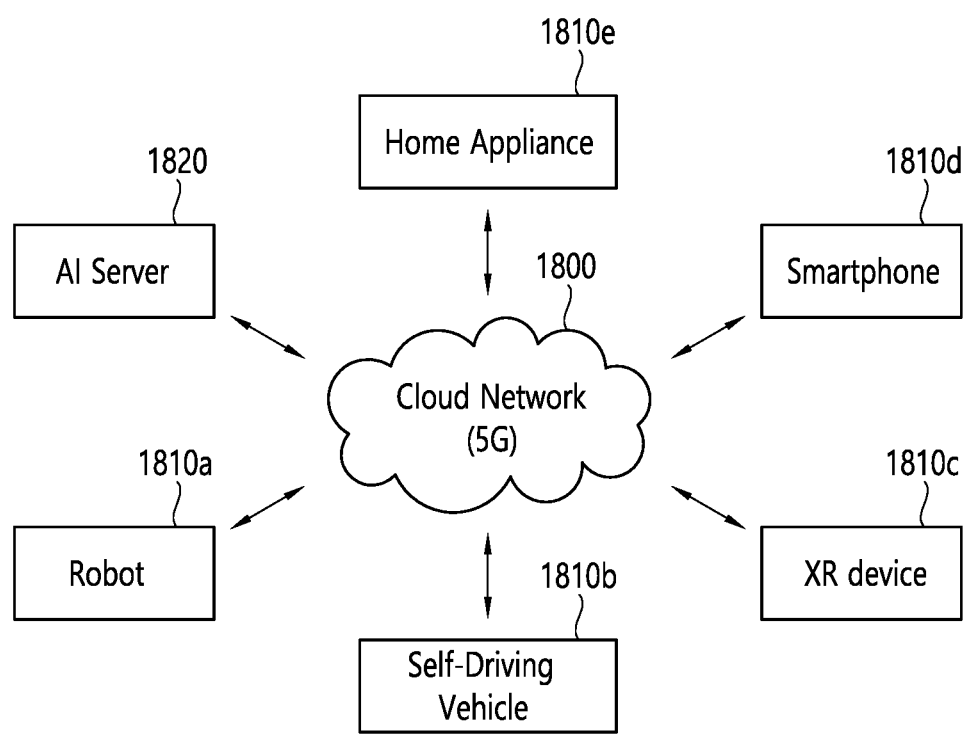
FIG. 18 shows an example of an AI system to which the technical features of the present disclosure can be applied.

FIG. 18 shows an example of an AI system to which the technical features of the present disclosure can be applied.

Referring to FIG. 18, in the AI system, at least one of an AI server 1720, a robot 1810a, an autonomous vehicle 1810b, an XR device 1810c, a smartphone 1810d and/or a home appliance 1810e is connected to a cloud network 1800. The robot 1810a, the autonomous vehicle 1810b, the XR device 1810c, the smartphone 1810d, and/or the home appliance 1810e to which the AI technology is applied may be referred to as AI devices 1810a to 1810e.

The cloud network 1800 may refer to a network that forms part of a cloud computing infrastructure and/or resides in a cloud computing infrastructure. The cloud network 1800 may be configured using a 3G network, a 4G or LTE network, and/or a 5G network. That is, each of the devices 1810a to 1810e and 1720 consisting the AI system may be connected to each other through the cloud network 1800. In particular, each of the devices 1810a to 1810e and 1720 may communicate with each other through a base station, but may directly communicate with each other without using a base station.

The AI server 1720 may include a server for performing AI processing and a server for performing operations on big data. The AI server 1720 is connected to at least one or more of AI devices constituting the AI system, i.e. the robot 1810a, the autonomous vehicle 1810b, the XR device 1810c, the smartphone 1810d and/or the home appliance 1810e through the cloud network 1800, and may assist at least some AI processing of the connected AI devices 1810a to 1810e. The AI server 1720 can learn the ANN according to the machine learning algorithm on behalf of the AI devices 1810a to 1810e, and can directly store the learning models and/or transmit them to the AI devices 1810a to 1810e. The AI server 1720 may receive the input data from the AI devices 1810a to 1810e, infer the result value with respect to the received input data using the learning model, generate a response and/or a control command based on the inferred result value, and transmit the generated data to the AI devices 1810a to 1810e. Alternatively, the AI devices 1810a to 1810e may directly infer a result value for the input data using a learning model, and generate a response and/or a control command based on the inferred result value.

Various embodiments of the AI devices 1810a to 1810e to which the technical features of the present disclosure can be applied will be described. The AI devices 1810a to 1810e shown in FIG. 18 can be seen as specific embodiments of the AI device 1100 shown in FIG. 11.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
receiving a paging from a network;
initiating a random access procedure after receiving the paging;
transmitting, to the network, a message 1 (Msg1) of the random access procedure including a preamble;
receiving, from the network, a message 2 (Msg2) of the random access procedure including a response for the preamble,
wherein the response includes an uplink (UL) grant;
transmitting, to the network, a message 3 (Msg3) of the random access procedure based on the UL grant,
wherein the Msg3 includes an early data transmission (EDT) cause; and
receiving, from the network, a message 4 (Msg4) of the random access procedure after transmitting the Msg3,
wherein the Msg4 includes downlink data related to the paging,
wherein the method further comprises determining whether a transmission of a paging response for the paging is required or not based on a configuration by the network,
wherein the Msg3 includes a non-access stratum (NAS) message for the paging response based on a determination that the transmission of the paging response is required, and
wherein the Msg3 excludes the NAS message for the paging response based on a determination that the transmission of the paging response is not required.

2. The method of claim 1, further comprising:
determining whether a transmission of an acknowledgment (ACK) information for the downlink data is required or not based on the configuration by the network; and
transmitting, to the network, the ACK information for downlink data based on a determination that the transmission of the ACK information is required.

3. The method of claim 2, further comprising:
in response to transmitting the ACK information, transitioning to an idle mode without receiving a radio resource control (RRC) connection release message from the network,
wherein the Msg3 excludes the NAS message for the paging response.

4. The method of claim 2, wherein the NAS message for the paging response and the ACK information for the DL data are transmitted in a same message.

5. The method of claim 1, further comprising:

transitioning to a connected mode in response to receiving the DL data.

6. The method of claim 1, wherein the downlink data is received via a non-access stratum (NAS) protocol data unit (PDU) during the random access procedure.

7. A wireless device in a wireless communication system, comprising:

a memory;

a transceiver; and at least one processor, operatively coupled to the memory and the transceiver, configured to:

control the transceiver to receive a paging from a network;

initiate a random access procedure after receiving the paging;

control the transceiver to transmit, to the network, a message 1 (Msg1) of the random access procedure including a preamble;

control the transceiver to receive, from the network, a message 2 (Msg2) of the random access procedure including a response for the preamble, wherein the response includes an uplink (UL) grant;

control the transceiver to transmit, to the network, a message 3 (Msg3) of the random access procedure based on the UL grant, wherein the Msg3 includes an early data transmission (EDT) cause; and control the transceiver to receive, from the network, a message 4 (Msg4) of the random access procedure after transmitting the Msg3, wherein the Msg4 includes downlink data related to the paging, wherein the at least one processor is further configured to determine whether a transmission of a paging response for the paging is required or not based on a configuration by the network, wherein the Msg3 includes a non-access stratum (NAS) message for the paging response based on a determination that the transmission of the paging response is required, and wherein the Msg3 excludes the NAS message for the paging response based on a determination that the transmission of the paging response is not required.

* * * * *